Figure 1:
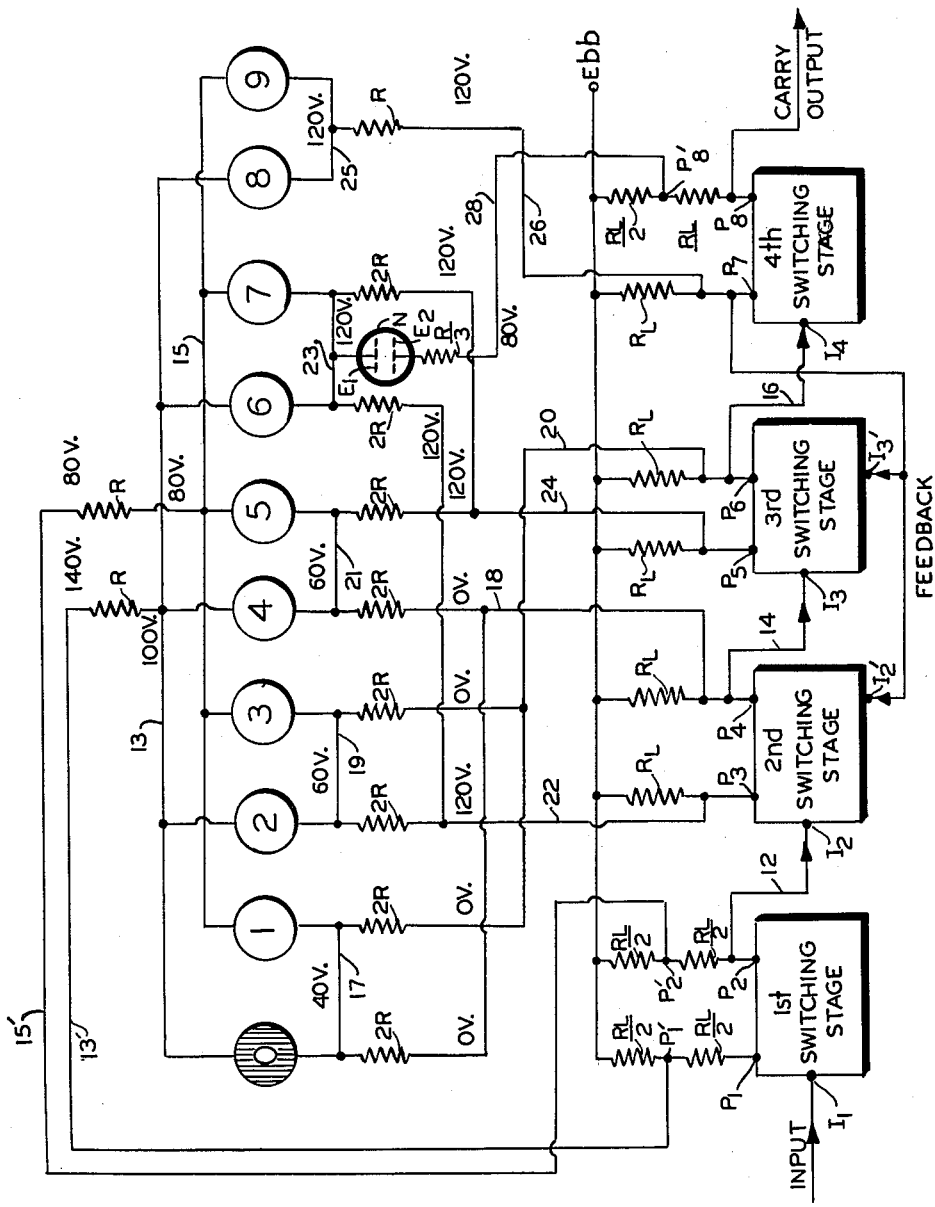
Figure 2:
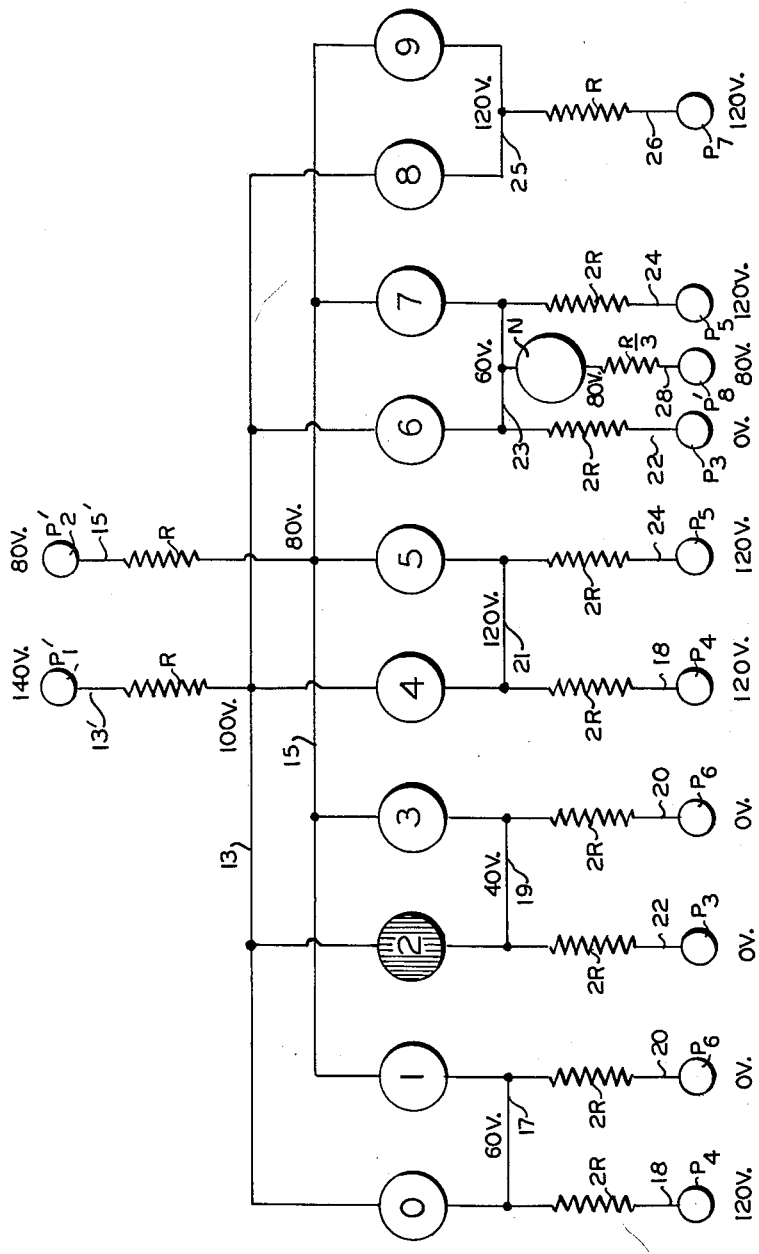
Figure 3:
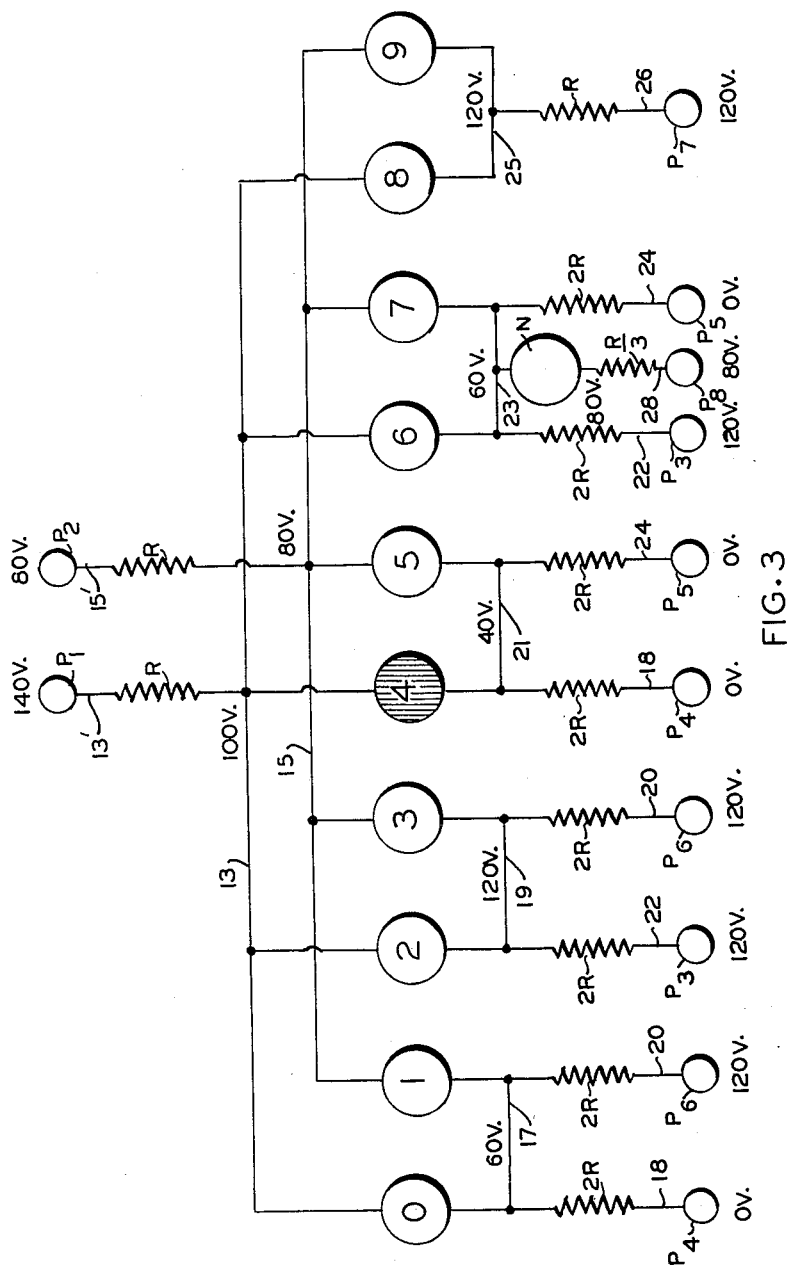
Figure 4:
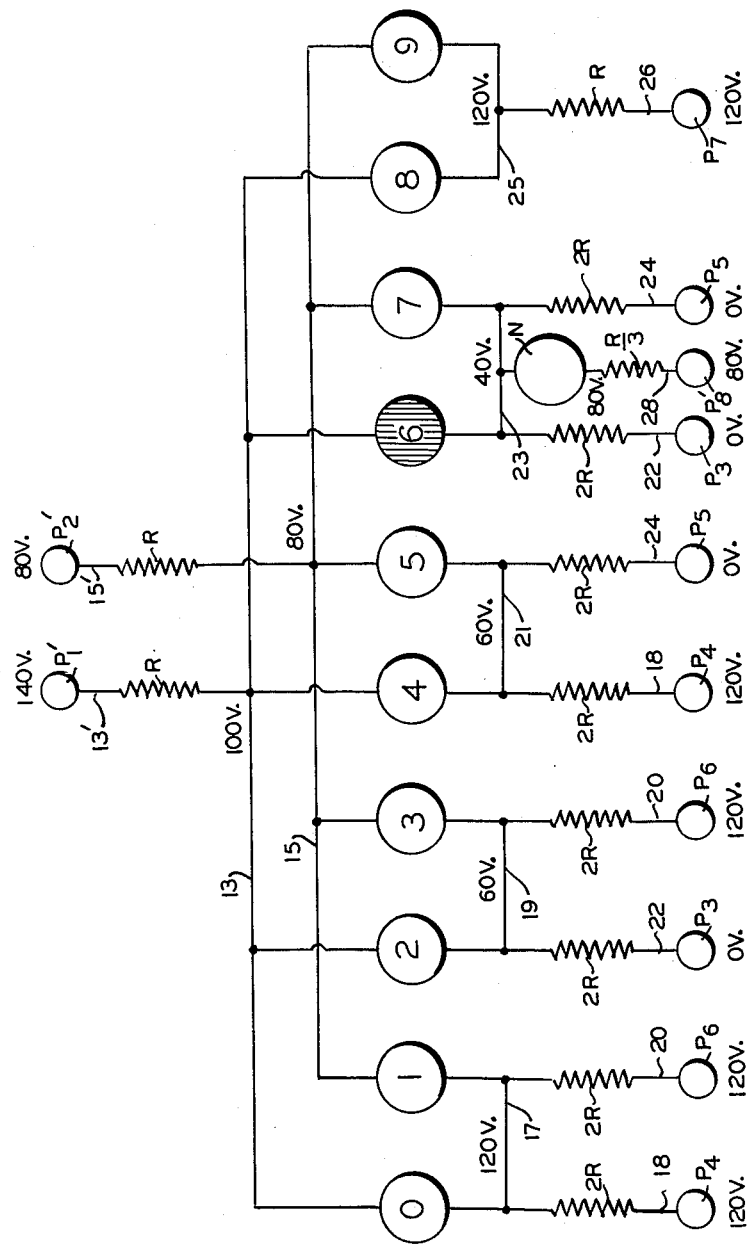

United States Patent Office 3,022,944
Patented Feb. 27, 1962

3,022,944
COUNTER AND DISPLAY SYSTEMS
Robert W. Stuart, Jr., Natick, Mass., assignor to General Radio Company, Cambridge, Mass., a corporation of Massachusetts
Filed Nov. 12, 1958, Ser. No. 773,511
16 Claims. (Cl. 235—92)

The present invention relates to switching systems and, more particularly, to electronic counter and display systems.

For purposes of illustration, the invention will be described in connection with its important application to decade counting and indicating or displaying apparatus though it is to be understood that the invention is of broader utility, as will be evident from the subsequent description. In such counting apparatus, successive serial-connected switching circuits are customarily employed, such as "flip-flop" or multivibrator electron-tube, transistor or other relay stages that are operable to assume either a first state, designated by "0," or a second state, designated by the numeral "1." For purposes of convention, the "0" state may represent the condition where the right-hand tube of the pair of "flip-flop" tubes is conducting and the left-hand tube is cut off, while the "1" state may represent the reverse condition. The counter is provided with an appropriate feedback system for obtaining a desired binary sequence of count. With four such switching stages, for example, the following binary sequence may be obtained as successive impulses are applied to the counter:

| Number of input impulse | State of switching stage | | | |
|---|---|---|---|---|
| | 1st | 2nd | 3rd | 4th |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |
| 0 | 0 | 0 | 0 | 0 |

Counter circuits for producing such operation and illuminating successive display bulbs, lamps or other indicators as the system counts from 0 through 9 are described, for example, in United States Letters Patent No. 2,521,788, issued September 12, 1950, to Igor E. Grosdoff. Unfortunately, however, while such a circuit can reliably operate the display bulbs without ambiguity, the feedback system required to produce the above sequence is subject to certain disadvantages; to wit, it is difficult to obtain reliable operation of the feedback system at low counting speeds and it is virtually impossible to obtain any operation of it at high counting speeds.

Resort may accordingly be had to a modified counting circuit of this nature provided with a feedback system that is not subject to these disadvantages, but that, to the contrary, reliably operates at low-counting speeds and at high speeds, as well. Such a binary number sequence, which is preferred for the purpose of the present invention, is the following:

| Number of input impulse | State of switching stage | | | |
|---|---|---|---|---|
| | 1st | 2nd | 3rd | 4th |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 1 | 1 | 1 |
| 9 | 1 | 1 | 1 | 1 |
| 0 | 0 | 0 | 0 | 0 |

It is inherently possible, however, in a decade counter employing the above binary sequence for one or more of the indicator bulbs to fire erroneously, as is later more fully explained. This, of course, is a most undesirable condition. While it may be remedied by increasing the power supply requirements, such as by increasing the plate swing of the switching-tube stages from, say, 120 volts to 180 volts, such a solution is clearly costly and undesirable. Similarly, networks employing diodes may be employed to prevent such spurious operation, but such networks again are relatively expensive and thus also do not provide a satisfactory solution from the commercial point of view.

It is, accordingly, an object of the present invention to overcome these disadvantages of the prior art and to provide a novel counting and indicating system, operable reliably at both low and high counting speeds, and provided with simple and inexpensive means for inhibiting erroneous operation of the counting indicator devices. In summary, this end is attained with the aid of an inhibiting network comprising a threshold-voltage-operated non-linear device, preferably a two-electrode neon tube and the like.

A further object is to provide a new and improved counting and indicating system.

Other and further objects will be explained hereinafter and will be more particularly pointed out in the appended claims.

The invention will now be described in connection with the accompanying drawing.

FIG. 1 of which is a circuit diagram of a decade counter constructed in accordance with a preferred embodiment of the invention, with the details of the switching circuits illustrated in block-diagram form in view of the fact that they are well known and in order not to complicate the drawing so as to detract from the novel features of the present invention; and FIGS. 2 through 5 are similar diagrams of the upper or indicator part of the system of FIG. 1, illustrating the operation for successively advanced counting conditions.

Associated with the 1st, 2nd, 3rd and 4th switching stages of FIG. 1, adapted to produce the second-mentioned binary sequence, above, are ten indicators, such as two-electrode neon bulbs or lamps numbered 0, 1, 2, 3, 4, 5, 6, 7, 8 and 9. The output circuit of each of the pair of "flip-flops" or other switching relays of the 1st, 2nd, 3rd and 4th switching stages is connected through preferably a resistor load to the positive terminal $E_{bb}$ of the power supply, as is well known. Thus, the output terminals $P_1$ and $P_2$ of the 1st Switching Stage and the output terminal $P_8$ of the 4th Switching Stage are shown connected to $E_{bb}$ through pairs of equal resistors, each of value $R_{L/2}$. The output terminals $P_3$, $P_4$ of the 2nd Switching Stage; $P_5$, $P_6$, of the 3rd Switching Stage; and $P_7$, of the 4th Switching Stage are all connected through resistors of value $R_L$ to the power-supply terminal $E_{bb}$. The successive switching stages are serially connected in conventional fashion, as is illustrated by the connections 12, 14 and 16 between the output terminals $P_2$, $P_4$ and $P_6$ and the respective input terminals $I_2$, $I_3$ and $I_4$ of the 2nd, 3rd and 4th switching stages. The impulses to be counted and indicated or displayed may be fed to the input terminals, represented at $I_1$, of the 1st Switching Stage, and the carry output of the decade counter may be connected to the output terminal $P_8$ of the 4th Switching Stage. The required feedback path for producing the desired binary sequence is shown labelled "Feedback" and connected from the output terminal $P_7$ of the 4th Switching Stage to the further input terminals $I_{2'}$ and $I_{3'}$ of the 2nd and 3rd switching stages, respectively, associated with the right-hand relays of the pairs of relays associated with each switching stage, as is well-known.

The upper terminals of indicator or display devices 0, 2, 4, 6 and 8 are connected to the common conductor 13 and the upper terminals of the odd indicators 1, 3, 5, 7 and 9 are similarly connected to a common conductor 15. Each of the common conductors 13 and 15 connects through a resistance of value R (such as, for example, approximately 200 kilohms) and respective conductors 13' and 15' to the mid-point terminals $P_{1'}$ and $P_{2'}$ of the output-circuit loads $R_{L/2}$ of the 1st Switching Stage. The lower terminal of each of the indicators 0, 1, 2, 3, 4, 5, 6 and 7 is connected to a resistor of value 2R (such as 400 kilohms) and the lower terminals of the pairs of indicators 0—1, 2—3, 4—5, 6—7 and 8—9 are connected together by respective conductors 17, 19, 21, 23 and 25. The resistors 2R connected to the lower terminals of indicators 0 and 4 are, in turn, connected to the right-hand output terminal $P_4$ of the 2nd Switching Stage by conductor 18. A similar connection is effected by conductor 20 to the right-hand output terminal $P_6$ of the 3rd Switching Stage from the resistors 2R associated with indicators 1 and 3. The resistors 2R connected to the lower terminals of indicators 2 and 6 also connect by conductor 22 to the left-hand output terminal $P_3$ of the 2nd Switching Stage. The left-hand output terminal $P_5$ of the 3rd Switching Stage similarly connects by conductor 24 to the resistors 2R associated with the indicators 5 and 7. The conductor 25, interconnecting the lower terminals of indicators 8 and 9 is, in the same manner, connected through a common resistor of value R by conductor 26 to the left-hand output terminal $P_7$ of the 4th Switching Stage.

In order to facilitate description of the operation of the preferred circuit of the present invention, typical voltage values are placed at appropriate locations in the circuit upon the assumption that, for example, electron-tube "flip-flop" switching circuits are employed, with an "off" tube plate voltage 40 volts below $E_{bb}$ and an "on" tube plate voltage 160 volts below $E_{bb}$. These voltage values are expressed as numerals followed by the symbol "V.," meaning volts; thus, for example, the upper terminals of the resistors R, connected between respective conductors 13—13' and 15—15', are shown maintained at voltages "140V." and "80V.," meaning one hundred forty volts and eighty volts, respectively. These voltages, for convenience, have been referred to the "on" plate voltage of the switching stages, this voltage being arbitrarily assigned as ground or zero volts ("0V."). The beforementioned illustrative 200K value of resistance R is suitable for use with neon-bulb indicators for a current of the order of 0.2 milliampere. The shading of indicators 0, 2, 4, 6 and 8 in FIGS. 1 through 5, furthermore, represents the firing of those indicator or display devices, it being understood that similar firing of indicators 1, 3, 5, 7 and 9 will occur with the voltages at terminals $P_{1'}$ and $P_{2'}$ reversed.

The novel inhibitor network of the present invention is shown connected between indicators 6 and 7. It comprises a threshold-voltage operated bi-laterally conducting neon or similar two-electrode gaseous-discharge tube or bulb N, though, as will be evident from the description, other devices having similar properties may be used. The upper electrode $E_1$ of the neon tube or similar device N, FIG. 1, is connected to conductor 23; and the lower electrode $E_2$ connects preferably through a resistance of value R/3 and by a conductor 28 to the mid-point $P_{8'}$ between the output-circuit resistors $R_{L/2}$ of the right-hand relay of the 4th Switching Stage. As is evident from FIGS. 1 thru 4 of the drawings, the inhibitor device N is inoperative for the states where the impulses numbered 0, 2, 4 and 6 are involved., and it may similarly be shown to be inoperative for impulses numbers 1, 3, 5 and 7, as well. For the impulse-number states 0 through 7, therefore, the proper indicator bulb or lamp is fired in response to the corresponding impulse number or count and all other indicator bulbs, as shown by the voltage values assigned in FIGS. 1 through 4, are held with a potential across them of no more than 40 volts. This is insufficient voltage to fire the other indicators so that unambiguous firing will occur. For NE-2 type neon bulbs, for example, the bulbs will fire at approximately 90 volts, assuming appropriate ambient light energy or other stimulus is present, and will conduct with 60 volts applied across the bulb, so that the not-more-than 40-volt condition reliably prevents any erroneous operation.

Figure 5:
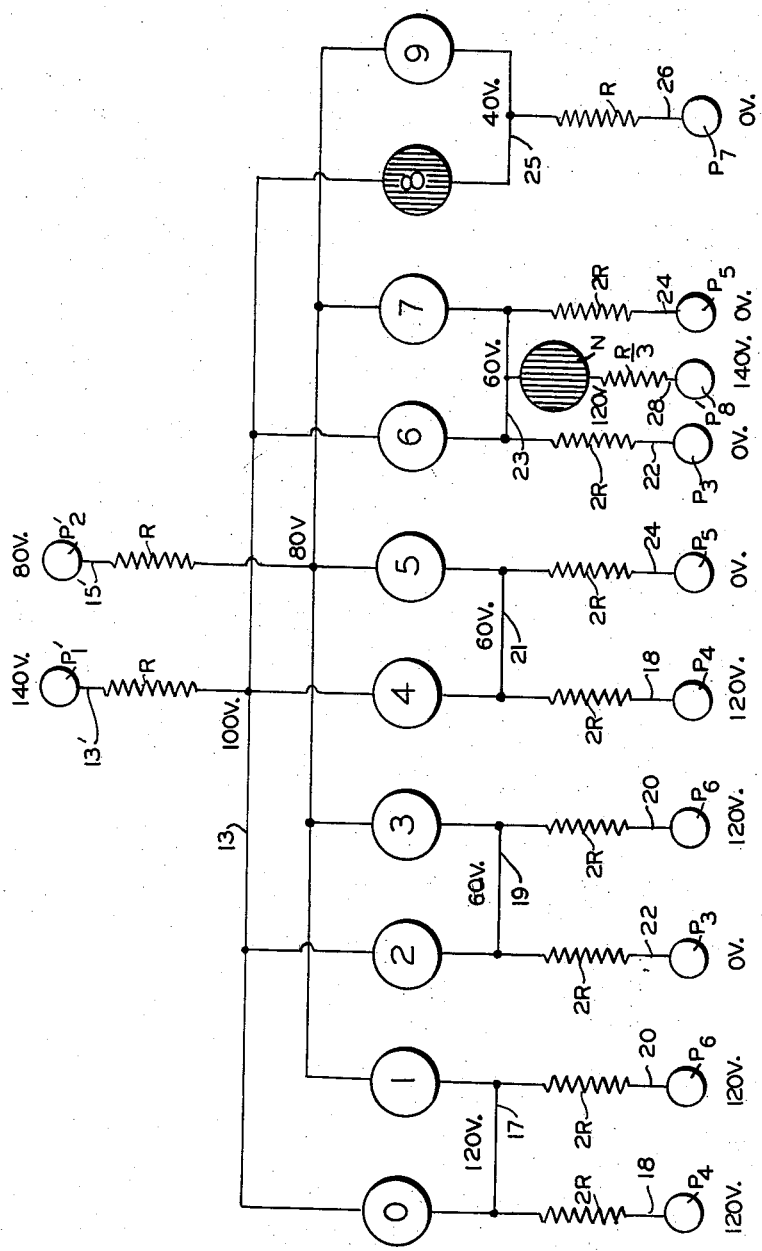

In FIG. 5, the situation is different. The lowered voltage at output terminal $P_7$ serves to fire the indicator or display device 8 correctly in the intended manner, as shown. In the absence of the inhibiting circuit N-R/3, however, the common junction 23 of indicators 6 and 7 will also fall in voltage value, causing indicator 6 to fire erroneously. Similarly, indicator 7 will erroneously fire when indicator 9 is fired. With the inhibiting circuit of the present invention, such erroneous operation is obviated. The fall in voltage of the 6—7 bulb junction 23, combined with the voltage rise of output terminal $P_{8'}$ will cause the inhibit device N to fire. The current through N is designed to be sufficient (preferably 3/2 of the normal indicator bulb current for the relative resistance values shown in this case) to hold the junction 23 of the 6—7 indicators high enough (60 volts), so that indicator 6 cannot fire because of the insufficient voltage across it (40 volts). The inhibitor N also similarly operates on state 9 to prevent erroneous firing of the indicator 7.

The present invention, therefore, with the aid of an inhibitor circuit comprising reliable and inexpensive threshold-voltage operated non-linear neon or similar devices, such as the before mentioned NE-2 type bulb, thus insures against erroneous indicator firing and completely overcomes all of the before-mentioned disadvantages of the prior art.

The extension of the neon bulb inhibiting system described herein can lead to further improvements in decade counter indicator systems. In particular, if a sufficient number of inhibiting neon bulbs are used, it is possible to reduce the voltage swing requirements of the flip-flops to 60 volts instead of the 120 volts required with one inhibitor circuit, or the 180 volts required with no inhibitor circuit.

Further modifications will occur to those skilled in the art and all such are considered to fall within the spirit and scope of the invention as defined in the appended claims.

What is claimed is:
1. An electric system having, in combination, a plurality of switching circuits for counting successive impulses, an indicator for displaying the resulting count of the switching circuits, and a coupling circuit interconnecting the switching circuits and the indicator and comprising a threshold-voltage operated non-linear device one terminal of which is connected with each of two switching circuits, and the other with a third switching circuit through electric-circuit connecting means.

2. An electric system having, in combination, a plurality of switching circuits for counting successive impulses, an indicator for displaying the resulting count of the switching circuits, and a coupling circuit interconnecting the switching circuits and the indicator and comprising a two-electrode gaseous-discharge device one terminal of which is connected with each of two switching circuits, and the other with a third switching circuit through electric-circuit connecting means.

3. An electric system having, in combination, a plurality of switching circuits for counting successive impulses, an indicator for displaying the resulting count of the switching circuits, and a coupling circuit interconnecting the switching circuits and the indicator and comprising a two-electrode neon-tube device one terminal of which is connected with each of two switching circuits, and the other with a third switching circuit through electric-circuit connecting means.

4. An electric system having, in combination, a plurality of switching circuits for counting successive impulses, and indicator comprising a plurality of display devices for registering successive counting sequences of the switching circuits, one of a pair of the display devices being normally undesirably operated upon the display operation of the other of the said pair in response to the counting action of the switching circuits, and a threshold-voltage-operated non-linear device connected in circuit with the said one display device for inhibiting its operation at the time of the said display operation of the said other of the display devices.

5. An electric system having, in combination, a plurality of switching circuits for counting successive impulses, an indicator comprising a plurality of display devices for registering successive counting sequences of the switching circuits, one of a pair of the display devices being normally undesirably operated upon the display operation of the other of the said pair in response to the counting action of the switching circuits, and a threshold-voltage-operated non-linear gaseous-discharge device connected in circuit with the said one display device for inhibiting its operation at the time of the said display operation of the said other of the display devices.

6. An electric system having, in combination, a plurality of switching circuits for counting successive impulses, an indicator comprising a plurality of display devices for registering successive counting sequences of the switching circuits, one of a pair of the display devices being normally undesirably operated upon the display operation of the other of the said pair in response to the counting action of the switching circuits, and a threshold-voltage-operated neon tube connected in circuit with the said one display device for inhibiting its operation at the time of the said display operation of the said other of the display devices.

7. An electric system having, in combination, a plurality of switching circuits for counting successive impulses, an indicator comprising a plurality of threshold-voltage-operated display devices for registering successive counting sequences of the switching circuits, one of a pair of the display devices having a voltage in excess of its threshold voltage normally undesirably applied thereto upon application of operating voltage in excess of the threshold voltage to the other of the said pair in response to the counting action of the switching circuits, and a threshold-voltage-operated non-linear device connected in circuit with the said one display device and adapted to operate upon operation of the said other of the display devices to maintain the voltage applied to the said one display device below the threshold voltage, thereby to inhibit the operation of the said one display device upon the display operation of the said other of the display devices.

8. An electric system having, in combination, a plurality of switching circuits for counting successive impulses, an indicator comprising a plurality of threshold-voltage-operated display devices for registering successive counting sequences of the switching circuits, one of a pair of the display devices having a voltage in excess of its threshold voltage normally undesirably applied thereto upon application of operating voltage in excess of the threshold voltages to the other of the said pair in response to the counting action of the switching circuits, and a threshold-voltage-operated neon tube connected in circuit with the said one display device and adapted to operate upon operation of the said other of the display devices to maintain the voltage applied to the said one display device below the threshold voltage, thereby to inhibit the operation of the said one display device upon the display operation of the said other of the display devices.

9. An electric system having, in combination, a plurality of switching circuits for counting successive impulses, an indicator comprising a plurality of display devices for registering successive counting sequences of the switching circuits, each of two of the display devices being normally undesirably operated respectively upon the display operation of each of two other of the display devices in response to the counting action of the switching circuits, and a threshold-voltage-operated non-linear device connected in circuit with the said first-named two display devices for inhibiting their operation upon the said display operation of the said other two of the display devices.

10. An electric system having, in combination, a plurality of switching circuits for counting successive impulses, an indicator comprising a plurality of display devices for registering successive counting sequences of the switching circuits, each of two of the display devices being normally undesirably operated respectively upon the display operation of each of two other of the display devices in response to the counting action of the switching circuits, and a threshold-voltage-operated non-linear gaseous-discharge device connected in circuit with the said first-named two display devices for inhibiting their operation upon the said display operation of the said other two of the display devices.

11. An electric system having, in combination, a plurality of switching circuits for counting successive impulses, an indicator comprising a plurality of display devices for registering successive counting sequences of the switching circuits, each of two of the display devices being normally undesirably operated respectively upon the display operation of each of two other of the display devices in response to the counting action of the switching circuits, and a threshold-voltage-operated neon tube connected in circuit with the said first-named two display devices for inhibiting their operation upon the said display operation of the said other two of the display devices.

12. An electric system having, in combination, a plurality of switching circuits for counting successive impulses, an indicator comprising a plurality of threshold-voltage-operated display devices for registering successive counting sequences of the switching circuits, each of two of the display devices having a voltage in excess of the threshold voltage normally undesirably applied thereto upon application of operating voltage respectively to each of two other of the display devices in response to the counting action of the switching circuits, and a threshold-voltage-operated non-linear device connected in circuit with the said first-named two display devices and adapted to operate upon operation of each of the said other two of the display devices to maintain the voltage applied to the respective display devices of the first-named two display devices below the threshold voltage, thereby to inhibit the operation of the first-named two display devices upon the display operation of the said other two of the display devices.

13. An electric system having, in combination, four serially connected binary switching circuits for counting successive decades of impulses in the sequence:

```
0000
1000
0100
1100
0010
1010
0110
1110
0111
1111
``` an indicator comprising a decade of display devices for registering successive counting sequences of the switching circuits from zero through nine, the sixth and seventh display devices of the decade of display devices being normally undesirably operated respectively upon the display operation of the eighth and ninth display devices in response to the counting action of the switching circuits, and a threshold-voltage-operated non-linear device connected in circuit with the said sixth and seventh display device for inhibiting their operation upon the said display operation respectively of the eighth and ninth display devices.

14. An electric system having, in combination, four serially-connected binary switching circuits for counting successive decades of impulses in the sequence:

```
0000
1000
0100
1100
0010
1010
0110
1110
0111
1111
``` an indicator comprising a decade of display devices for registering successive counting sequences of the switching circuits from zero through nine, the sixth and seventh display devices of the decade of display devices being normally undesirably operated respectively upon the display operation of the eighth and ninth display devices in response to the counting action of the switching circuits, and a threshold-voltage-operated neon tube connected in circuit with the said sixth and seventh display device for inhibiting their operation upon the said display operation respectively of the eighth and ninth display devices.

15. An electric system as claimed in claim 13 and in which the said sixth and seventh display devices are connected to a common terminal and from the common terminal, respectively, to the second and third of the four switching circuits through similar resistances; the non-linear device is connected between the said common terminal and, through further resistance of less value, to the fourth switching circuit; and the eighth and ninth display devices are connected through resistance greater than the further resistance but less than that of the similar resistances to the fourth switching circuit.

16. An electric system as claimed in claim 15 and in which the relation between the said similar resistances, the said further resistance and the last-named resistance is substantially 2R, R/3 and R.

References Cited in the file of this patent

UNITED STATES PATENTS 2,763,432     York                Sept. 18, 1956
2,862,660     Purcell             Dec. 2, 1958

OTHER REFERENCES

Basic Electronics, Navy Training Courses, NAVPERS 10087, Washington, 1955 (pp. 84–86 relied on).